Oct. 7, 1958

W. F. MORGAN 2,855,553

MOTOR SPEED CONTROL

Filed Dec. 21, 1954

INVENTOR.
WILLIAM F. MORGAN

BY

Albert R. Hodges

ATTORNEY

Oct. 7, 1958  W. F. MORGAN  2,855,553
MOTOR SPEED CONTROL
Filed Dec. 21, 1954  2 Sheets-Sheet 2
FIG. 2
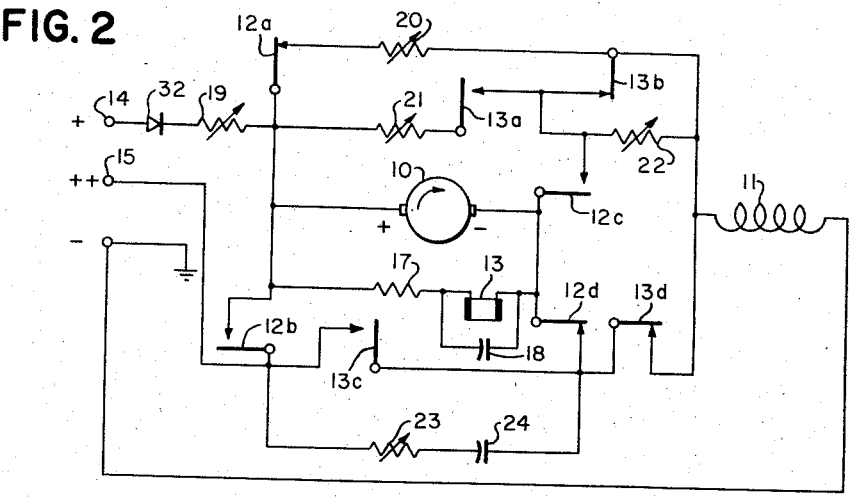
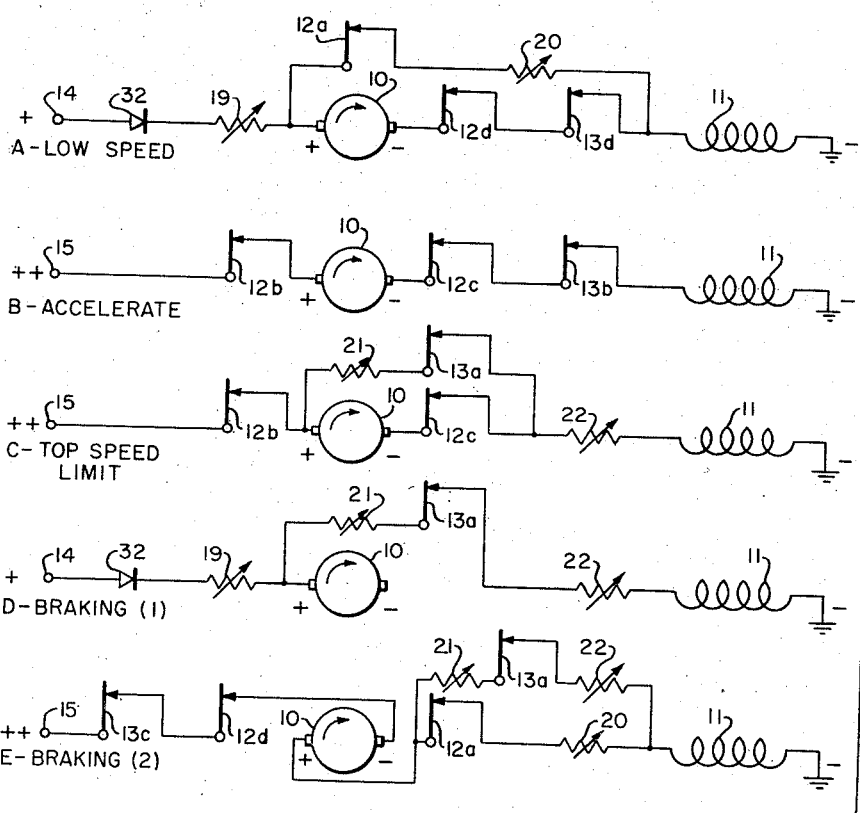
FIG. 3

United States Patent Office 2,855,553
Patented Oct. 7, 1958

2,855,553

MOTOR SPEED CONTROL

William F. Morgan, Vestal, N. Y., assignor to International Business Machines Corporation, New York, N. Y., a corporation of New York Application December 21, 1954, Serial No. 476,655

6 Claims. (Cl. 318—248)

This invention relates to motor speed controls, and more particularly to a dual-speed motor control. Although not limited thereto, the arrangement of the present invention is especially adapted for controlling the paper-drive motor on a business machine such as a high-speed lister.

Previously known motor speed controls have not proved entirely satisfactory for use in such applications. Some of the prior-art devices were too complicated and expensive to manufacture. Other formerly used arrangements have proved incapable of providing sufficiently rapid acceleration of deceleration of the motor to meet the stringent requirements of paper drives.

It is a principal object of the present invention, therefore, to provide an improved motor speed control of relatively simple construction.

Another object is to provide a motor control which is capable of effectuating extremely rapid changes in motor speed.

A further object of the present invention is to provide an arrangement which insures rapid changes in speed to predetermined values.

Still another object is to provide a motor speed control which permits acceleration from a predetermined first speed to a predetermined second speed, followed by deceleration to the predetermined first speed.

An additional object of the present invention is to provide a motor speed control in which the motor has continuous unidirectional rotation.

Still a further object of the invention is to provide a motor control which is especially adapted for dual-speed paper drives on business machines such as high-speed listers.

In accordance with the present invention, there is provided a speed control for an electric motor which comprises the combination of a number of structural elements. These elements include means for operating the motor at a predetermined first speed, means for accelerating the motor to a predetermined second speed upon the closing of a switch, means for operating the motor at the second speed while this switch remains closed, and means for decelerating the motor to the first speed upon the opening of the switch.

During operation at the first speed, the armature and field are preferably energized from a first potential source. A second potential source is preferably provided for energizing the armature and field during acceleration. The decelerating means preferably include means for successively energizing the field from the first potential source and then energizing both the armature and the field from the second potential source. The decelerating means preferably utilizes electrical braking.

In accordance with another important feature of the present invention, stabilizing means may be provided for energizing the field from both the first and second potential sources for a predetermined time interval after the motor decelerates to the first speed.

Other objects and features of the present invention will be pointed out in the following description and claims and illustrated in the accompanying drawings, which disclose, by way of example, the principle of the invention and the best mode, which has been contemplated, of applying that principle.

In the drawings, in which like reference numerals designate like components:

Fig. 2 is a simplified circuit diagram of the motor speed control of Fig. 1; and Figs. 3A–3E illustrate, in simplified diagrammatic form, circuit configurations which occur successively as the motor speed control of Fig. 1 goes through a complete cycle of operation.

Figure 1:
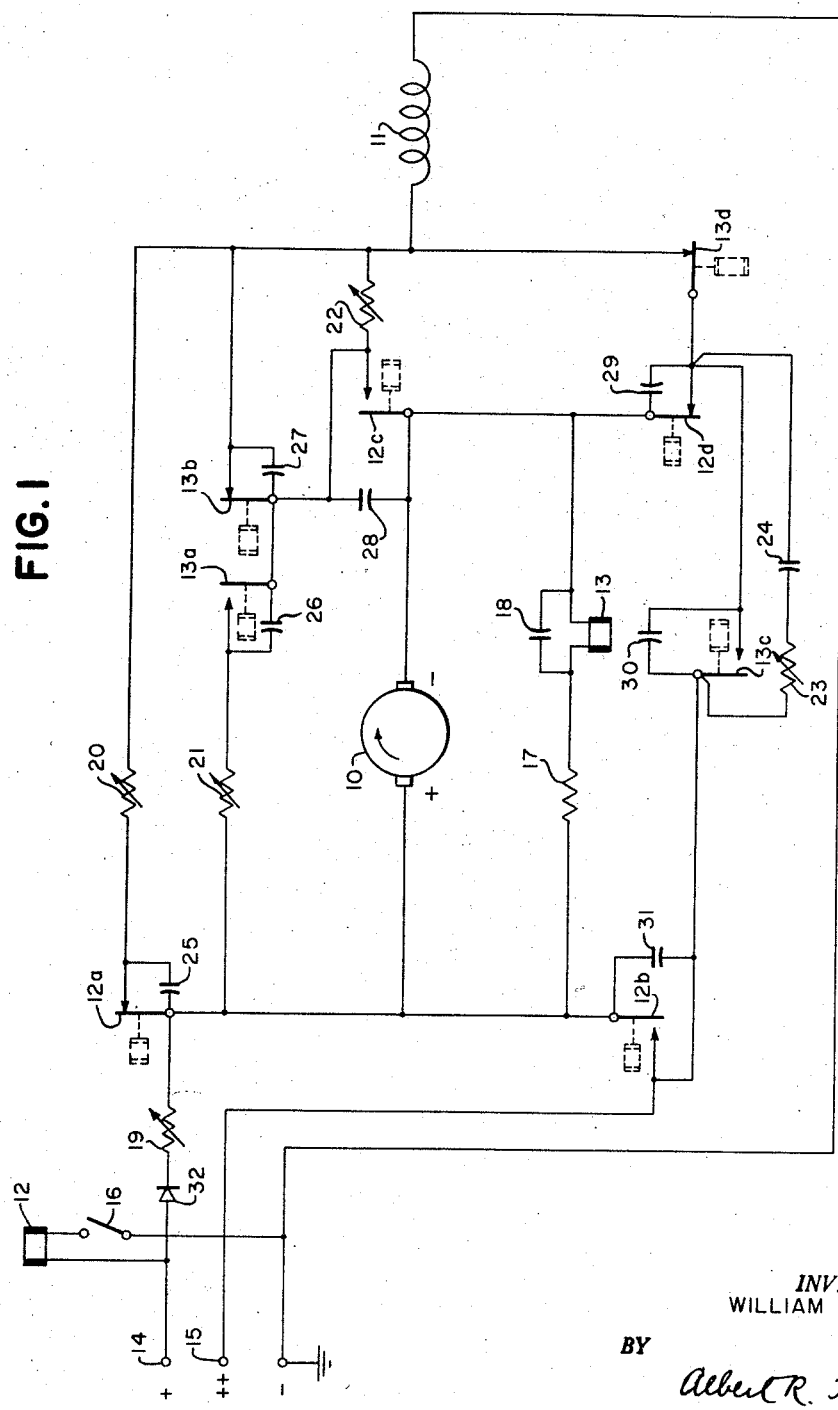
Fig. 1 is a schematic circuit diagram of one embodiment of a motor speed control in accordance with the present invention.

Referring to Fig. 1 of the drawings, there is shown a motor having an armature 10 and a field 11, relays 12 and 13, a relatively low positive potential source 14 and a relatively high positive potential source 15 having a common negative or ground terminal, and a number of associated capacitors and resistors. As shown in Fig. 1, the motor control is in its normal condition under which the motor operates at the first and lower of two predetermined speeds. Under this condition, relays 12 and 13 are released. Relay contacts 12a, 12d, 13b and 13d are closed. Relay contacts 12b, 12c, 13a and 13c are open. Relay 12 picks up upon the closing of a switch 16 which is actuated by the mechanism (not shown) with which the motor speed control is to be used. The closing of switch 16 may be considered as calling for the beginning of acceleration. The opening of this switch, which causes the release of relay 12, serves to indicate that decelerating or braking is to begin.

As shown in Fig. 1, the coil of relay 13 is always connected in series with a resistor 17 across armature 10, but during low-speed operation the voltage across the relay coil is insufficient to cause its pickup. Furthermore, this relay does not immediately pick up as the voltage across armature 10 rises, however, since a capacitor 18 shunted across the coil of relay 13 serves, in combination with resistor 17, as a time-delay means to delay the pickup of relay 13. This is an important feature of the present invention.

Resistor 19, preferably adjustable, may be connected in series with low-potential source 14 and, if used, serves to adjust the predetermined first or low speed of the motor. A preferably adjustable resistor 20, connected across armature 10 during low-speed operation, improves the regulation of the motor and may also be adjusted to set the predetermined first or low speed of the motor. If desired, resistor 19 may be eliminated, speed control being enhanced by the use of governor-controlled contacts in series with resistor 20. These contacts open momentarily whenever the speed falls below the predetermined first speed. Resistors 21 and 22 both preferably adjustable together serve to limit the predetermined second or high speed of the motor. Resistor 21 provides close speed regulation while resistor 22 primarily serves to limit the current flowing in the circuit.

A resistor 23, preferably adjustable, may be connected as shown in series with a capacitor 24 across relay contacts 13c to provide optional stabilizing means for a purpose which will be described later. Capacitors 25, 26, 27, 28, 29, 30 and 31 are utilized for the purpose of minimizing arcing of the relay contacts with which they are respectively associated. A rectifier element 32 is connected in series with low-potential source 14 to prevent current flow, due to the difference in potential of sources 14 and 15, upon the closing of relay contacts 12b.

The operation of the motor speed control in accordance with the present invention will be more clearly understood by reference to Fig. 2 and to Figs. 3A–3E, which respectively show only those portions of the simplified diagram of Fig. 2 that are utilized during each of the several steps comprising a complete operating cycle.

Referring first to Fig. 3A, there is shown the configuration of the circuit elements for low-speed operation of the motor (also illustrated by Figs. 1 and 2). In this case, armature 10 and field 11 are effectively connected in series with rectifier element 32 and resistor 19 between low-potential source 14 and ground, since relay contacts 12d and 13d are in their normally closed positions. Due to the fact that relay contacts 12a are closed, resistor 20 is shunted across armature 10 to improve the speed regulation. Adjustable resistor 19 permits the speed of the motor to be adjusted to a desired predetermined first value.

Operation with the circuit configuration of Fig. 3A continues with the motor rotating at the predetermined first speed, until the closing of switch 16 occurs, which in turn causes relay 12 to pick up. In the resulting accelerating phase, which is illustrated by Fig. 3B, relay contacts 12b and 12c are closed, so that armature 10 and field 11 are effectively connected in series through normally closed relay contacts 13b between high-potential source 15 and ground. No resistors remain in the series path, and speed-regulating resistor 20 is rendered ineffectual by the opening of relay contacts 12a. Accordingly, the motor rapidly accelerates from the predetermined first speed to a predetermined second speed.

In order to prevent the rapidly accelerating motor from exceeding the predetermined second speed, the increasing voltage across armature 10 is applied through resistor 17 to the coil of relay 13 so that, as soon as shunt capacitor 18 has become sufficiently charged, relay 13 picks up. The pickup of relay 13 closes contacts 13a, thus shunting resistor 21 across armature 10. The opening of contacts 13b introduces resistor 22 in series with armature 10 and field 11. Both resistors act to limit the speed of the motor, and adjustable resistor 22 permits the predetermined second speed to be adjusted to a desired value. Fig. 3C shows this speed-limiting phase of operation. Furthermore, contacts 13d open and contacts 13c close, so that any charge which may remain in capacitor 24 is dissipated through resistor 23.

Operation continues with the circuit configuration of Fig. 3C, the motor speed being held to the predetermined second value, until the opening of switch 16 occurs, resulting in the release of relay 12. Due to the design of relay 12, the opening of contacts 12b and 12c, disconnecting armature 10 from high-potential source 15, occurs slightly before contacts 12a and 12d close. During this transition perior the armature is still rotating at high speed with its field 11 supplied from low-potential source 14 through closed contacts 13a, as illustrated in Fig. 3D. Accordingly, a voltage is generated across armature 10 having the polarity indicated in this figure, so that current continues to flow through resistor 17 and the coil of relay 13 in the same direction as before. Relay 13 therefore remains energized and relay contacts 13a and 13c remain closed. This is the first phase of the deceleration or braking operation.

The second phase of the deceleration or braking operation begins with the closing of contacts 12a and 12d. As illustrated in Fig. 3E, armature 10 and field 11 are now connected in series with resistor 20 between high-potential source 15 and ground. Resistors 21 and 22 in series are shunted across resistor 20. It is important to note that, in this case, the armature is connected in the circuit in the opposite polarity from that shown in each of Figs. 3A, 3B, and 3C. Accordingly, a relatively large but resistance-limited current flows through armature 10 from − to +, which is the opposite direction from its previous flow. The current flows through field 11, however, in the same direction as before. The motor therefore develops torque in the opposite direction from that in which it is rotating and is thus rapidly decelerated. This is the well-known principle of electrical braking, sometimes referred to as "plugging" the motor. It will be apparent, therefore, that deceleration is accomplished in two distinct steps, by successively energizing field 11 from potential source 14 and then energizing both armature 10 and field 11 from potential source 15.

In the meantime, since field 11 has not been reversed and since the direction of rotation of armature 10 is unchanged, the voltage generated across the armature retains its original polarity, so that relay 13 at first remains energized. As the armature slows down, however, the generated E. M. F. decreases until the armature voltage becomes insufficient to hold relay 13 picked up. When relay 13 releases, its contacts 13a and 13c open, thus disconnecting high-potential source 15 from field 11. At the same time, contacts 13b and 13d close, thereby completing the original low-speed circuit, as shown in Fig. 3A. The motor will now run again at the predetermined first speed from low-potential source 14.

In certain applications of the motor speed control in accordance with the present invention, a momentary increase in the speed of the motor has been noted after the completion of the second phase of the braking operation. In accordance with an important feature of the present invention, this occasionally encountered difficulty may be overcome by the optional provision of stabilizing means comprising resistor 23 and capacitor 24 connected in series across relay contacts 13c. The provision of this network permits field 11 to be energized from both low-potential source 14 and high-potential source 15 for a predetermined time interval after the motor decelerates to the predetermined first speed. This flow of a higher current through field 11 for a short time after contacts 13d close substantially prevents any objectionable speed increase during this period. The length of the time interval over which this optional stabilizing control is exerted is readily adjusted by an appropriate selection of the values of resistor 23 and capacitor 24.

It will be understood that the polarities mentioned above and the polarity markings shown in the drawings with respect to armature 10 and potential sources 14 and 15 are solely for convenience in describing the operation of the invention, and that these polarities may be reversed throughout if desired without departing from the scope thereof.

In one particular embodiment of the present invention in accordance with Fig. 1 of the drawings, which has been built and successfully operated, the following constants were employed:

| | |
|---|---|
| Capacitors 18, 25, 26, 29 | 0.5 microfard. |
| Capacitor 24 | 1000 microfards. |
| Capacitors 27, 28, 30, 31 | 5.0 microfards. |
| Resistor 17 | 200 ohms. |
| Resistor 19 | 5.0 ohms (adj). |
| Resistor 20 | 10.0 ohms (adj.). |
| Resistors 21 and 23 | 15.0 ohms (adj.). |
| Resistor 22 | 10.0 ohms (adj.). |
| Potential source 14 | 45 volts D. C. |
| Potential source 15 | 150 volts D. C. |

Employing the above constants and using a ⅙-horsepower, 115-volt universal motor of standard design but preferably with forced ventilation, it was found possible to complete a cycle of operation in less than 65 milliseconds and to operate at rates as high as 500 cycles per minute. In this particular application, the predetermined first speed was approximately 1500 r. p. m. and the predetermined second speed approximately 3600 r. p. m.

While there have been shown and described and pointed out the fundamental novel features of the invention as applied to a preferred embodiment, it will be understood that various omissions and substitutions and changes in the form and details of the device illustrated and in its opera-

What is claimed is:

1. A speed control for an electric motor having an armature and a field, comprising the combination of: first and second potential sources; means for connecting said armature in a first polarity and said field in series with said first potential source for operation of said motor at a predetermined first speed; means for connecting said armature in said first polarity and said field in series with said second potential source for acceleration of said motor to a predetermined second speed; and means for first connecting only said field in series with said first potential source and for then connecting said armature in a second polarity and said field in series with said second potential source, whereby said motor is decelerated from said second speed to said first speed.

2. A speed control for an electric motor having an armature and a field, comprising the combination of: first and second potential sources; means for connecting said armature in a first polarity and said field in series with said first potential source for operation of said motor at a predetermined first speed; means for connecting said armature in said first polarity and said field in series with said second potential source for acceleration of said motor to a predetermined second speed; means for first connecting only said field in series with said first potential source and for then connecting said armature in a second polarity and said field in series with said second potential source, whereby said motor is decelerated from said second speed to said first speed; and means for connecting said field to both said first and second potential sources for a predetermined time interval after said motor has decelerated to said first speed to stabilize the operation of said motor at said first speed.

3. A speed control for an electric motor having an armature and a field, comprising the combination of: first and second potential sources; means for connecting said armature in a first polarity and said field in series with said first potential source for operation of said motor at a predetermined first speed; means for connecting said armature in said first polarity and said field in series with said second potential source for acceleration of said motor to a predetermined second speed; means for connecting speed-limiting elements in circuit with said armature and field, said means including time-delay means responsive to the potential across said armature, whereby said motor is maintained substantially at said second speed; and means for first connecting only said field in series with said first potential source and for then connecting said armature in a second polarity and said field in series with said second potential source, whereby said motor is decelerated from said second speed to said first speed.

4. A speed control for an electric motor having an armature and a field, comprising the combination of: first and second potential sources; means for connecting said armature in a first polarity and said field in series with said first potential source for operation of said motor at a predetermined first speed; means for connecting said armature in said first polarity and said field in series with said second potential source for acceleration of said motor to a predetermined second speed; means for connecting speed-limiting elements in circuit with said armature and field, said means including capacitively reactive means responsive to the potential across said armature, whereby said motor is maintained substantially at said second speed; and means for first connecting only said field in series with said first potential source and for then connecting said armature in a second polarity and said field in series with said second potential source, whereby said motor is decelerated from said second speed to said first speed.

5. A speed control for an electric motor having an armature and a field, comprising the combination of: first and second potential sources; means for connecting said armature in a first polarity and said field in series with said first potential source for operation of said motor at a predetermined first speed; means for connecting said armature in said first polarity and said field in series with said second potential source for acceleration of said motor to a predetermined second speed; means for connecting a first speed-limiting element in shunt with said armature and a second speed-limiting element in series with said armature and said field, said means including time-delay means responsive to the potential across said armature, whereby said motor is maintained substantially at said second speed; and means for first connecting only said field in series with said first potential source and for then connecting said armature in a second polarity and said field in series with said second potential source, whereby said motor is decelerated from said second speed to said first speed.

6. A speed control for an electric motor having an armature and a field, comprising the combination of: first and second potential sources; means for connecting said armature in a first polarity and said field in series with said first potential source for operation of said motor at a predetermined first speed; means for connecting said armature in said first polarity and said field in series with said second potential source for acceleration of said motor to a predetermined second speed; means for connecting speed-limiting elements in circuit with said armature and field, said means including time-delay means responsive to the potential across said armature, whereby said motor is maintained substantially at said second speed; means for first connecting only said field in series with said first potential source and for then connecting said armature in a second polarity and said field in series with said second potential source, whereby said motor is decelerated from said second speed to said first speed; and means for connecting said field to both said first and second potential sources for a predetermined time interval after said motor has decelerated to said first speed to stabilize the operation of said motor at said first speed.

References Cited in the file of this patent

UNITED STATES PATENTS

| | | |
|---|---|---|
| 875,584 | James | Dec. 31, 1907 |
| 1,605,977 | Oswald | Nov. 9, 1926 |
| 1,771,896 | Mortensen et al. | July 29, 1930 |
| 2,183,491 | Neuman | Dec. 12, 1939 |
| 2,575,021 | Leitch et al. | Nov. 13, 1951 |
| 2,646,540 | Taylor | July 21, 1953 |